US012776610B2

(12) United States Patent
Kandin

(10) Patent No.: US 12,776,610 B2
(45) Date of Patent: Oct. 27, 2026

(54) DEVICE FOR AN ELECTRICAL PLUG PROVIDED WITH A WINDING MEANS

(71) Applicant: Patrice Kandin, Meyrargues (FR)

(72) Inventor: Patrice Kandin, Meyrargues (FR)

( * ) Notice: Subject to any disclaimer, the term of this patent is extended or adjusted under 35 U.S.C. 154(b) by 646 days.

(21) Appl. No.: 17/631,700

(22) PCT Filed: Aug. 4, 2020

(86) PCT No.: PCT/FR2020/000217
§ 371 (c)(1),
(2) Date: Jan. 31, 2022

(87) PCT Pub. No.: WO2021/019135
PCT Pub. Date: Feb. 4, 2021

(65) Prior Publication Data
US 2022/0271480 A1 Aug. 25, 2022

(30) Foreign Application Priority Data
Aug. 1, 2019 (FR) ...................................... 1908862

(51) Int. Cl.
*H01R 13/72* (2006.01)
*H01R 13/508* (2006.01)
*H01R 13/639* (2006.01)

(52) U.S. Cl.
CPC ........... *H01R 13/72* (2013.01); *H01R 13/508* (2013.01); *H01R 13/639* (2013.01); *H01R 2201/26* (2013.01)

(58) Field of Classification Search
CPC .. H01R 13/72; H01R 13/508; H01R 2201/26; H01R 13/639; H01R 13/6392;
(Continued)

(56) References Cited

U.S. PATENT DOCUMENTS 4,875,879 A * 10/1989 Bunyea ................ H01R 13/639 439/457
5,921,805 A * 7/1999 Tabata ............... H01R 13/5837 439/942
(Continued)

FOREIGN PATENT DOCUMENTS

CN 108683028 A * 10/2018 ......... H01R 13/6392
DE 1207176 B 12/1965
(Continued)

OTHER PUBLICATIONS

International Search Report for PCT/FR2020/000217 dated, Oct. 7, 2020 (PCT/ISA/210).

*Primary Examiner* — renee s luebke
*Assistant Examiner* — Paul D Baillargeon
(74) *Attorney, Agent, or Firm* — Sughrue Mion, PLLC

(57) ABSTRACT

An electrical connector provided with a winder mechanism for temporarily fastening the cable to which it is attached and facilitate winding cables that are connected to electrical appliances, or extension cords, or cables for recharging electric vehicles and the like. The connector comprises a connector body (A) that includes a fastener mechanism with two plates (Cro1, Cro2, C) for temporarily fastening the cable to which the connector is attached. One plate (Cro1) is integral with the connector body (A). The two plates (Cro1, Cro2) are assembled together face-to-face via their pivot axis C, which is situated on a horizontal axis (AXH) that is common to both plates (Cro1, Cro2). The electrical connector is particularly intended for cables for recharging batteries of electric vehicles.

20 Claims, 5 Drawing Sheets

(58) Field of Classification Search
CPC ......... H01R 13/58; B60L 53/16; B65H 75/42; B65H 75/4421; B65H 75/4423
See application file for complete search history.

(56) References Cited

U.S. PATENT DOCUMENTS

| | | | | |
|---|---|---|---|---|
| 6,327,139 | B1 * | 12/2001 | Champion | H05K 7/1491<br>174/72 A |
| 7,168,973 | B2 * | 1/2007 | Wascow | H01R 13/6392<br>439/373 |
| 10,464,429 | B2 * | 11/2019 | Djrbashian | B60L 53/16 |

FOREIGN PATENT DOCUMENTS

| | | | | |
|---|---|---|---|---|
| DE | 298 08 962 U1 | | 11/1998 | |
| DE | 102019002777 A1 | * | 11/2019 | B60L 53/18 |

* cited by examiner

DEVICE FOR AN ELECTRICAL PLUG PROVIDED WITH A WINDING MEANS

CROSS REFERENCE TO RELATED APPLICATIONS

This application is a National Stage of International Application No. PCT/FR2020/000217 filed Aug. 4, 2020, claiming priority based on French Patent Application No. 1908862 filed Aug. 1, 2019.

The present invention relates to an electrical connector provided with winding means.

Electric cables are generally found to be difficult to wind, because they twist and turn in all directions, deteriorating quickly, and making it very difficult to obtain good windings.

An object of the present invention is thus to make it easier to wind cables that are connected to electrical appliances, or extension cords, or indeed electric vehicle recharging cables.

According to the invention, the electrical connector includes means for temporarily fastening the cable to which the connector is attached.

In a first embodiment, the fastener means are constituted by a first plate integral with the body of the connector and a second plate that are rotatably connected about an axis of rotation appearing on the first plate: the first plate presenting an upwardly-open notch in its bottom edge, which edge is formed by a circular arc originating at a connection point situated on the right-hand edge of the notch; and the second plate presenting a downwardly notch in its top edge, which edge is formed by a circular arc originating at a connection point situated on the right-hand edge of the notch.

Preferably, one of the circular arcs subtends an angle at the center that is equal to the sum of 180° plus an additional angle lying in the range 0° to 60°.

In a second embodiment, the fastener means are constituted by a housing fastened on the connector, a slider being arranged in the housing, the slider being designed to wedge the cable in the housing by means of a spring.

In a third embodiment, the fastener means consist in a cylindrical ring presenting an opening angle associated with closure means.

By way of example, the closure means are hinged to the ring.

In a fourth embodiment, the closure means (S) surround the ring.

In a first option, the opening angle lies in the range 50° to 100°.

In a second option, the opening angle lies in the range 150° to 190°.

In a preferred embodiment, holder means are provided that are fastened to the body of the connector.

According to an additional characteristic, a tab is provided on the second plate, which tab is perpendicular to the plate.

An advantageous application of the invention lies with cables for recharging batteries of electric vehicles.

The present invention appears below in greater detail in the following description of embodiments given by way of illustration and with reference to the accompanying figures, in which.

Elements present in more than one of the figures are given the same references in each of them.

Figure 1:
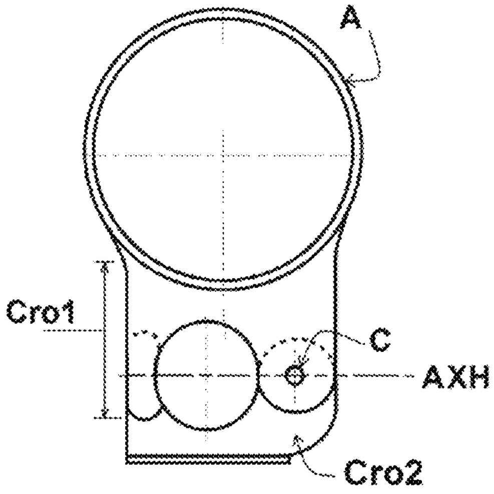
FIG. 1 shows a first embodiment of the device when closed.

With reference to FIG. 1, in a first embodiment, a first plate (Cro1) integral with the body of the connector (A) is in the form of an elongate blade of rectangular shape with bottom edges that are rounded. The plate has a horizontal axis (AXH) that is parallel to its bottom edge. It is provided with a pivot axis (C) on its right-hand edge and, in this example, the pivot axis lies on said horizontal axis (AXH).

Figure 3:
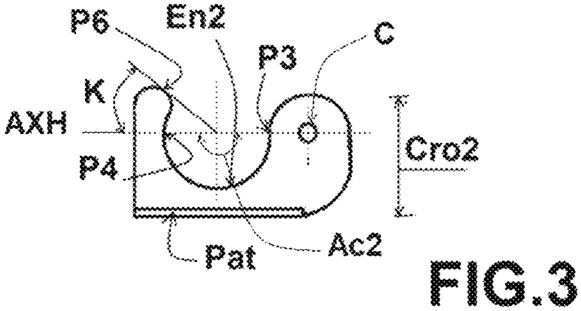
FIG. 3 shows the pivot plate in the first embodiment.
Figure 4:
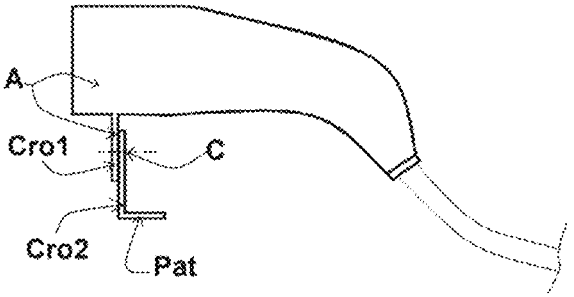
FIG. 4 shows the first embodiment of the device in profile view.

With reference to FIG. 3, a second plate (Cro2) is in the form of an elongate plate of rectangular shape with top edges that are rounded, this plate having a horizontal axis (AXH). It is provided with a pivot axis (C) on its right-hand edge and, in this example, the pivot axis lies on the horizontal axis (AXH).

Figure 2:
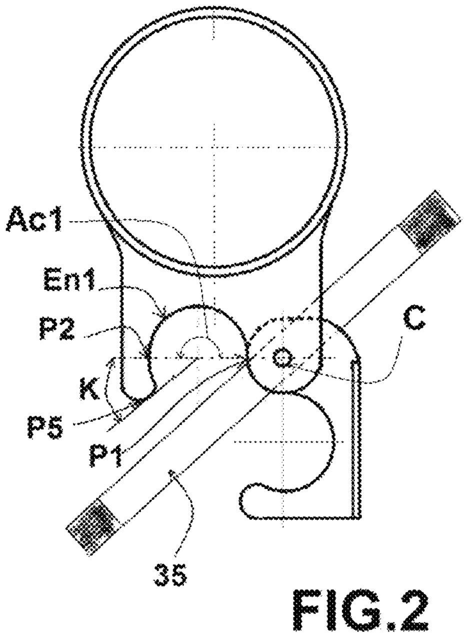
FIG. 2 shows the first embodiment of the device when open.

With reference to FIGS. 1 and 2, the first plate (Cro1) presents an upwardly-open notch (En1) in its bottom edge. Two connection points (P1, P2) are defined as the points of intersection between the notch and the horizontal axis (AXH). The notch (En1) is in the shape of a first circular arc (Ac1).

Returning to FIG. 3, the second plate (Cro2) presents a downwardly-open notch (En2) in its top edge. Two connection points (P3, P4) are defined as the points of intersection between the notch and the horizontal axis (AXH). The notch (En2) is in the shape of a second circular arc (Ac2).

The circular arcs (Ac1, Ac2) subtend an angle at the center that is equal to the sum of 180° plus an additional angle (K). They terminate at respective points (P5, P6) at the left-hand ends of the plates. The additional angle (K) is not less than 0°. In practice, its value may be as much as 50°. Typically, it is about 47°.

With reference to FIGS. 1 and 2, the two plates (Cro1 and Cro2) are assembled together face-to-face by their pivot axis (C), which is common to both of them. The assembly means (not shown) may be a bolt, a caulked pin, a rivet, or any other analogous means known to the person skilled in the art.

On the second plate (Cro2) there can be seen a tab (Pat) that projects forwards and that is thus perpendicular thereto. The function of the tab (Pat) is to make it easier to take hold of the electrical connector.

In FIG. 2, the device is shown in its open position, such that an electric cable can be inserted into one of the notches, providing it has the same diameter as the circular arcs.

Thus, a first loop is formed in the cable, which therefore presents two strands. The first strand is attached to the connector, and the second strand is free. The device is opened, so as to insert the free strand in the notch in one of the plates. Finally, the plates of the device are closed so as to hold this strand captive, and as a result it is firmly held stationary. It then suffices to turn the loop in order to wind the cable.

In FIG. 1, the device is shown in its closed position.

It shows clearly the circle that is formed by the two notches (En1, En2) when their horizontal axes (AHX) are in alignment. This circle serves to hold the free strand of the loop firmly captive.

The circular arcs (Ac1 and Ac2) preferably subtend an angle at the center that is equal to the sum of 180° plus an additional angle (K) lying in the range 0° to 60°.

Specifically, it is preferable for this additional angle to be greater than 0°, so that the cable is lightly pinched on being inserted into the device and so as to prevent the cable from being able to escape when the two plates are closed. Preferably, this angle is equal to about 47°.

In FIG. 2, there can also be seen holder means (35) for holding the cable captive when it is fully wound. These means may be a lace or a tape provided with a self-gripping strip. Ideally, they are fastened to the pivot axis (C) or to the body of the electrical connector (A).

Figure 5:
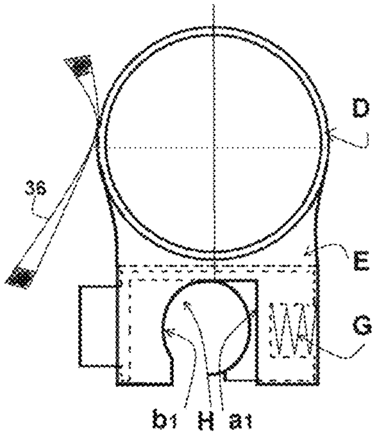
FIG. 5 shows a second embodiment of the device when closed.

With reference to FIG. 5, in a second embodiment, the body of the connector (D) has a housing (E) in which a slider (F) that is arranged at least in part in the housing (E) can be moved to the right and can be returned to its initial position by means of a spring (G).

The housing (E) is in the shape of a hollow rectangular box and in its bottom edge it presents a first notch (H) that is upwardly open, the notch being vertical in shape on its right-hand portion (a1) and circularly arcuate in shape on its left-hand portion (b1).

The slider (F) is in the shape of a solid rectangular block. In its bottom edge it presents a second notch (B) that is upwardly open, the notch being vertical in shape on its right-hand portion (c1) and circularly arcuate in shape on its left-hand portion (d1).

In its right-hand edge it presents a third notch (L) that serves to hold the spring (G) captive and to guide it.

On its left-hand edge, it presents a portion of smaller size than its body, this portion projects from the housing and acts as a button (M) for actuating the slider (F).

Figure 6:
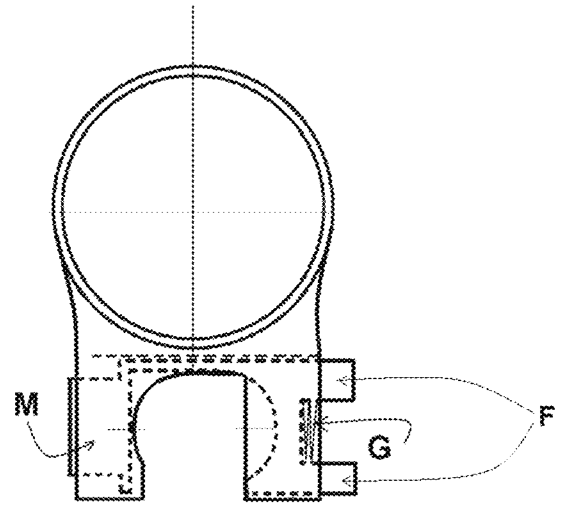
FIG. 6 shows the second embodiment of the device when open.
Figure 7:
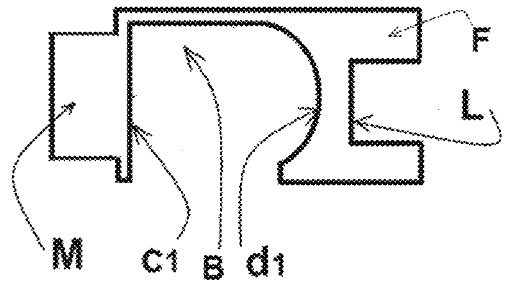
FIG. 7 shows the slider of the second embodiment of the device.
Figure 8:
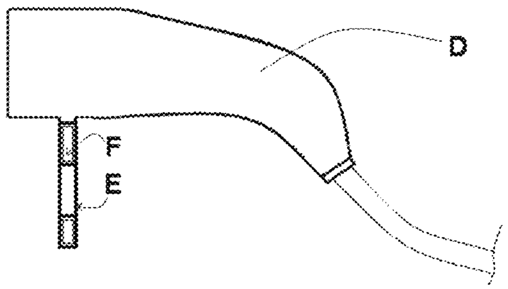
FIG. 8 shows the second embodiment of the device in profile view.

With reference to FIG. 6, in the open position, when the button (M) of the slider (F) is pressed, the slider moves back towards the right and releases a passage into which a strand of the electric cable can be inserted.

With reference to FIG. 5, in the closed position, the slider (F) returns to its initial position because of the spring (G) and it compresses the electric cable.

Thus, a first loop is formed in the cable, which thus presents two strands. The first strand is attached to the connector (A, D, P, Y), and the second strand is free. The button is pressed so as to release the passage and enable the free second strand to be inserted into the notch. Finally, pressure on the button is released, so as to hold the strand captive, thereby holding it firmly stationary. It then suffices to turn the loop in order to wind the cable.

There can also be seen holder means (36) for holding the cable captive when it is fully wound. These means may be a lace or a tape provided with a self-gripping strip. Ideally, these means are fastened to the body of the connector (D).

Figure 10:
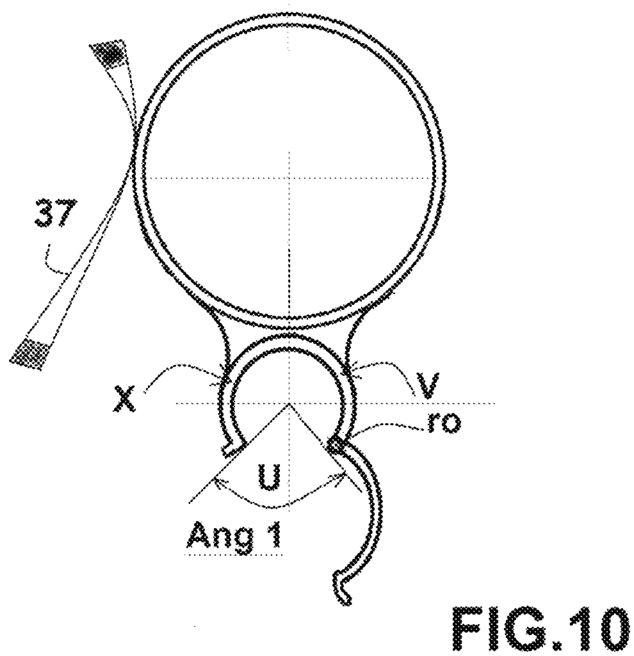
FIG. 10 shows the third embodiment of the device when open.

With reference to FIG. 10, in a third embodiment and when in the open position, the body of the connector (P) has a cylindrical ring (Ano1) that is open in part over an angle (Ang1) lying in the range 50° et 100°, thereby defining two arms (V) and (X). Typically, this opening angle is equal to about 65°.

The free space (U) that is created in this way enables a strand of the electric cable to be inserted and held stationary in the ring.

Figure 9:
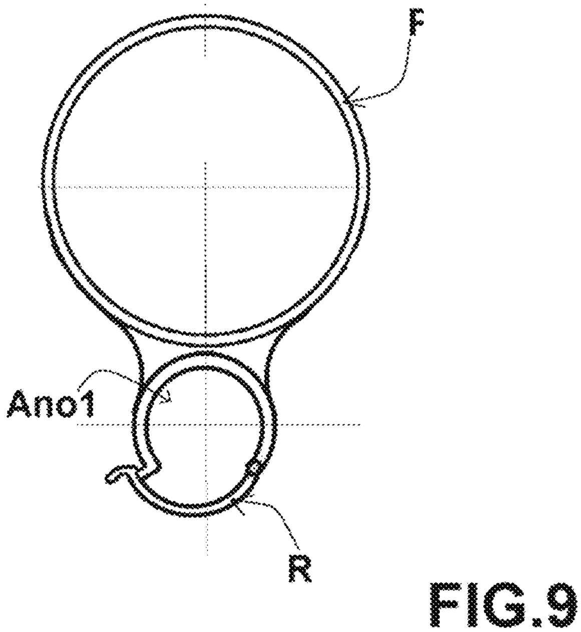
FIG. 9 shows a third embodiment of the device when closed.

With reference to FIG. 9, and in the closed position, closure means (R) are positioned to connect the two arms (V) and (X) together. These closure means comprise a circular arc having the same diameter as the ring, and hinged to the end of one of the arms (V) about an axis of rotation (ro).

Thus, a first loop is formed in the cable, which therefor presents two strands. The first strand is attached to the connector (P), and the free second strand is inserted in the ring (Ano1), which holds it stationary by means of the two arms (V, X). Finally, the closure means (R) are closed. It then suffices to turn the loop as formed in this way in order to proceed with winding the cable.

There can also be seen holder means (37) for holding the cable captive when it is fully wound. These means may be a lace or a tape provided with a self-gripping strip. Ideally, these means are fastened to the body of the connector (P).

Figure 11:
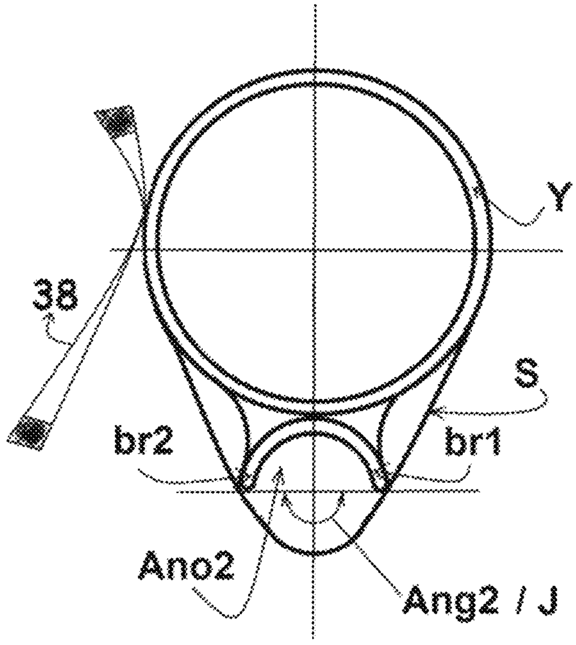
FIG. 11 shows a fourth embodiment of the device when closed.

With reference to FIG. 11, in a fourth embodiment and when in the closed position, the body of the connector (Y) has a cylindrical ring (Ano2) that is open in part over an angle (Ang2) lying in the range 50° et 190°. Typically, this angle is equal to about 180°. The free space (J) as created in this way enables a strand of the electric cable to be inserted and positioned between the two arms (br1, br2). Closure means (S) are placed on the body of the connector (Y) and surround the two arms (br1, br2).

Thus, a first loop is formed in the cable, which therefore presents two strands. The first strand is attached to the connector (Y), and the free second strand is inserted in the ring (Ano2), which holds it partially by means of the two arms (V, X). Finally, the closure means (S) are closed. It then suffices to turn the loop as formed in this way in order to proceed with winding the cable.

There can also be seen holder means (38) for holding the cable captive when it is fully wound. These means may be a lace or a tape provided with a self-gripping strip. Ideally, these means are fastened to the body of the connector (Y).

Thus, the person skilled in the art can readily understand that there exist an infinity of solutions for fastening a strand of a cable to an electrical connector.

The invention thus provides an electrical connector provided with means for temporarily fastening the cable to which it is attached, regardless of the form of those means.

The embodiments of the invention described above have been selected for their concrete natures. Nevertheless, it is not possible to list exhaustively all embodiments covered by the invention. In particular, any of the means described may be replaced by equivalent means without going beyond the ambit of the present invention.

The invention claimed is:

1. An electrical connector comprising fastener means for temporarily fastening a cable to which the electrical connector is attached; wherein said fastener means comprises a housing fastened on said connector, the housing comprises a first notch defining a through opening configured to receive a portion of the cable such that the cable extends out of the through opening from both sides of the through opening, a slider is arranged in the housing, said slider configured to wedge said portion of the cable in the through opening by a spring;

wherein the fastening means is fixed to the electrical connector in a plugged and an unplugged state of the electrical connector; and wherein the fastening means is configured to retain said portion of the cable after disconnection of the electrical connector from a mating socket, so as to form a stable cable loop adjacent to the connector, the loop serving as mechanical anchoring for winding the cable during storage.

2. The electrical connector according to claim 1, wherein holder means are provided that are fastened to a body of the connector.

3. The electrical connector according to claim 1, wherein the cable is for recharging batteries of electric vehicles.

4. The electrical connector according to claim 1, wherein the fastener means is an integral part of the connector.

5. The electrical connector according to claim 4, wherein the fastening means is configured to unfasten the cable when the electrical connector is in use.

6. The electrical connector according to claim 1, wherein said slider comprises a second notch and wherein each of said first notch and said second notch comprises an arcuate portion configured to engage and wedge the portion of the cable.

7. An electrical connector comprising fastener means for temporarily fastening a cable to which the electrical connector is attached;

wherein said fastener means comprises a first plate integral with a body of said connector and a second plate rotatably connected about an axis of rotation appearing on said first plate;

said first plate presenting an upwardly-open notch in a bottom edge of said first plate, which edge is formed by a first circular arc originating at a connection point situated on the edge of said first plate; and said second plate presenting a downwardly-open notch in a top edge of said second plate, which edge is formed by a second circular arc originating at a connection point situated on the edge of said second plate.

8. The electrical connector according to claim 7, wherein said circular arcs subtend an angle at the center that is equal to the sum of 180° plus an additional angle lying in the range 0° to 60°.

9. The electrical connector according to claim 7, wherein holder means are provided that are fastened to said body of the connector.

10. The electrical connector according to claim 7, wherein a tab is provided on said second plate, which tab is perpendicular to the plate.

11. An electrical connector system, comprising:

an electrical connector plug;

an electrical cable extending from the electrical connector plug and conductively coupled to the electrical connector; and fastener means for temporarily fastening the cable;

wherein the fastener means comprises a housing fixed to the electrical connector plug, the housing comprises a first notch defining a through opening configured to receive a portion of the electrical cable such that the cable extends out of the through opening from both sides of the through opening, a clamping mechanism configured to clamp said portion of the cable in the through opening;

wherein the fastening means is fixed to the electrical connector plug in a plugged and an unplugged state of the electrical connector plug; and wherein the fastening means is configured to retain said portion of the cable after disconnection of the electrical connector from a mating socket, so as to form a stable cable loop adjacent to the connector, the loop serving as mechanical anchoring for winding the cable during storage.

12. The electrical connector system according to claim 11, wherein electrical connector is an electric vehicle charging connector.

13. The electrical connector system according to claim 11, wherein clamping mechanism is biased to clamp said portion of the cable in the through opening by a spring.

14. The electrical connector system according to claim 11, wherein clamping mechanism comprises a slider slidably mounted in the housing.

15. The electrical connector system according to claim 11, wherein clamping mechanism is a pivoting plate.

16. The electrical connector system according to claim 11, wherein the through opening comprises opposed arcuate surfaces configured to engage the cable.

17. The electrical connector system according to claim 11, wherein the through opening comprises two opposing notches formed in the housing.

18. The electrical connector system according to claim 11, wherein the fastening means is configured to retain the portion of the electrical cable in a fixed position adjacent to the connector plug.

19. The electrical connector system according to claim 11, wherein the housing is integrally formed with the electrical connector plug.

20. The electrical connector system according to claim 11, wherein the fastener means is configured to retain a portion of the cable forming a first loop adjacent to the plug, the loop acting as an anchor that enables winding of the cable for storage.

* * * * *